United States Patent
Bai et al.

(10) Patent No.: US 11,287,828 B2
(45) Date of Patent: Mar. 29, 2022

(54) OBSTACLE DETECTION METHOD AND APPARATUS AND ROBOT USING THE SAME

(71) Applicant: UBTECH ROBOTICS CORP LTD, Shenzhen (CN)

(72) Inventors: Longbiao Bai, Shenzhen (CN); Youjun Xiong, Shenzhen (CN); Zhichao Liu, Shenzhen (CN); Hongjian Liu, Shenzhen (CN); Zhanjia Bi, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 354 days.

(21) Appl. No.: 16/427,362

(22) Filed: May 31, 2019

(65) Prior Publication Data
US 2020/0209880 A1    Jul. 2, 2020

(30) Foreign Application Priority Data
Dec. 28, 2018    (CN) .......................... 201811625712.7

(51) Int. Cl.
    G05D 1/00    (2006.01)
    G05D 1/02    (2020.01)
    G06T 7/70    (2017.01)
    G06T 7/20    (2017.01)

(52) U.S. Cl.
    CPC ............. *G05D 1/0246* (2013.01); *G06T 7/20* (2013.01); *G06T 7/70* (2017.01); *G05D 2201/02* (2013.01); *G06T 2207/30244* (2013.01)

(58) Field of Classification Search
    CPC .... G05D 1/0246; G05D 2201/02; G06T 7/70; G06T 7/20; G06T 2207/30244
    USPC .......................................................... 700/245
    See application file for complete search history.

(56) References Cited

U.S. PATENT DOCUMENTS

| | | | |
|---|---|---|---|
| 2019/0225266 A1* | 7/2019 | Enomoto | G01S 13/86 |
| 2020/0211243 A1* | 7/2020 | Ulusoy | G06T 11/60 |
| 2020/0225673 A1* | 7/2020 | Ebrahimi Afrouzi | G05D 1/0214 |
| 2020/0401820 A1* | 12/2020 | Nagata | G06K 9/00845 |

\* cited by examiner

*Primary Examiner* — Tyler J Lee
*Assistant Examiner* — Tiffany P Ohman (57) ABSTRACT

The present disclosure provides an obstacle detection method as well as an apparatus and a robot using the same. The method includes: obtaining, through the sensor module, image(s); detecting an obstacle image of an obstacle from the image(s) according to characteristic(s) of the obstacle; extracting image feature(s) of the obstacle; obtaining, through the sensor module, a position of the obstacle; associating the image feature(s) of the obstacle with the position of the obstacle; calculating a motion state a the obstacle based on the position information of the obstacle at different moments; and estimating the position of the obstacle in a detection blind zone of the robot based on the motion state. In such a manner, it is capable of providing more accurate position information of the obstacle in the detection blind zone, which is beneficial to the robot to plan a safe and fast moving path.

20 Claims, 5 Drawing Sheets

OBSTACLE DETECTION METHOD AND APPARATUS AND ROBOT USING THE SAME

CROSS REFERENCE TO RELATED APPLICATION PROGRAMS

This application claims priority to Chinese Patent Application No. CN201811625712.7, filed Dec. 28, 2018, which is hereby incorporated by reference herein as if set forth in its entirety.

BACKGROUND

1. Technical Field

The present disclosure relates to robot technology, and particularly to an obstacle detection method as well as an apparatus and a robot using the same.

2. Description of Related Art

Figure 1:
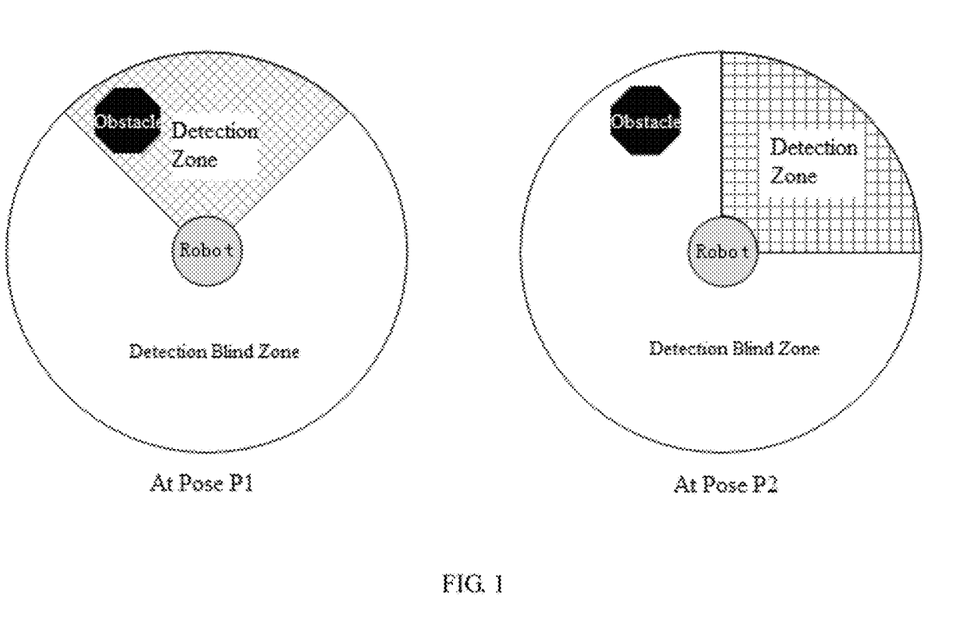
FIG. 1 is a schematic diagram of a detection zone of a robot according to an embodiment of the present disclosure.

In a navigation process for a robot, the robot needs to obtain the state of the obstacles around the predetermined moving path in real time, so as to plan a safe and fast moving path in real time to avoid the obstacles around. However, due to cost considerations, many moveable robots cannot be equip with qualified and enough sensors, which results in the narrow detection zone of robot and cannot update the distribution state of the obstacles around the robot in time. FIG. 1 is a schematic diagram of a detection zone of a robot according to an embodiment of the present disclosure. As shown in FIG. 1, if the robot is at a pose (e.g., a position and a posture) P1, the obstacle can be detected; otherwise, if the robot is changed to a pose P2, the obstacle cannot be detected because it is located in a detection blind zone of the robot.

In order to process information of the obstacle effectively, a timed manner is generally used. That is, if the detection blind zone is not re-detected after a period of time, the information of the obstacle in the detection blind zone is cleared. However, if the information of the obstacle is cleared, it is impossible to determine whether the obstacle recorded in the detection blind zone is moved, while there are not only static obstacles or dynamic obstacles. Therefore, the method cannot accurately determine whether there is an obstacle or not, and is disadvantageous for the robot to plan a safe and fast moving path.

BRIEF DESCRIPTION OF THE DRAWINGS

To describe the technical schemes in the embodiments of the present disclosure more clearly, the following briefly introduces the drawings required for describing the embodiments or the prior an. Apparently, the drawings in the follow ing description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 2:
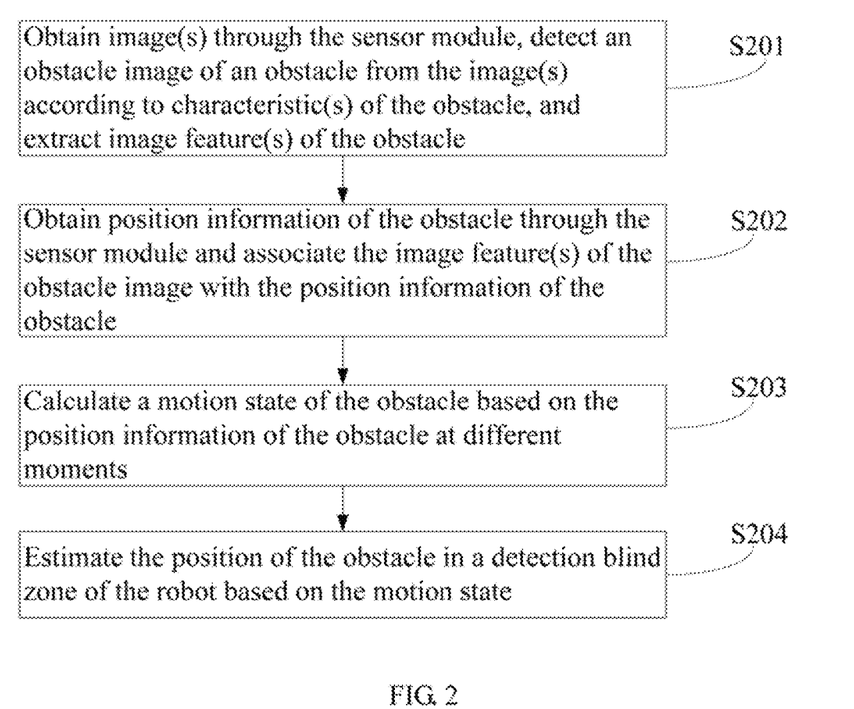
FIG. 2 is a flow chart of an embodiment of an obstacle detection method for a robot according to the present disclosure.
Figure 4:
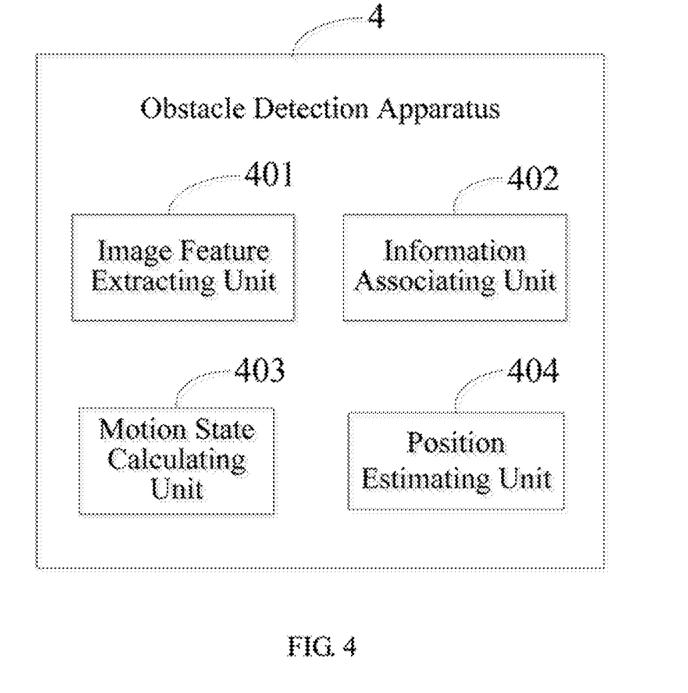
FIG. 4 is a schematic block diagram of an embodiment of an obstacle detection apparatus for a robot according to the present disclosure.
Figure 5:
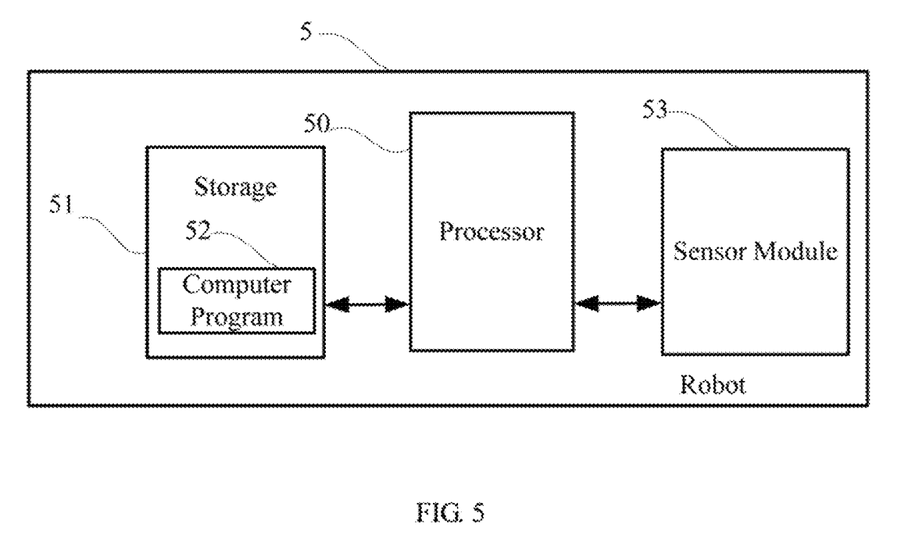
FIG. 5 is a schematic block diagram of an embodiment of a robot according to the present disclosure.

FIG. 2 is a flow chart of an embodiment of an obstacle detection method for a robot according to the present disclosure. In this embodiment, an obstacle detection method for a robot is provided. The method is a computer-implemented method executable for a processor, which may be implemented through and applied to an obstacle detection apparatus as shown in FIG. 4 that is for a robot having at least a sensor module or a robot as shown in FIG. 5 that has at least a sensor module, or through a storage medium. If the sensor module includes an RGBD sensor, the RGBD sensor obtains image feature(s) and depth map data of an obstacle and obtains position information and the contour feature(s) of the obstacle based on depth map data; and if the sensor module includes an RGB sensor and a lidar, the RGB sensor obtains image feature(s) of an obstacle, and the lidar obtains position information and contour feature(s) of the obstacle. As shown in FIG. 2, the method includes the following steps.

S201: obtaining image(s) through the sensor module, detecting an obstacle image of an obstacle from the image(s) according to characteristic(s) of the obstacle, and extracting image feature(s) of the obstacle.

In this embodiment, the sensor module for obtaining (i.e., collecting) the image(s) may include an RGB camera or an RGBD sensor, while the image may be a color image. Whether an object can be considered as the obstacle can be determined based on whether the object will affect the normal movement of the robot or not. For example, if the object is a paper and a leave, it will not be considered as the obstacle since it does not affect the normal movement of the robot, while a person, a car, or an animal in the scene can be considered as the obstacle.

In order to recognize the obstacle in the image(s) effectively, parameters of the obstacle for recognizing the object as the obstacle can be set in advance. The parameters of the obstacle may include, for example, the size, the hardness, and the like of the obstacle. The size of the obstacle may include the height, the width, and the like of the obstacle. The hardness of the object in the image can be determined by recognizing the category of the object first, and then determining the hardness of the object based on the recognized category of the object. The hardness of the object is compared with the preset hardness of the obstacle to determine whether the object is the obstacle, for example, if the object is a hanging tape, due to its hardness does not affect the movement of the robot, it will not be considered as the obstacle.

In this embodiment, the features of the obstacle may include the image feature(s), contour feature(s), and position information. In which, the contour feature(s) of the obstacle can be obtained by a depth sensor (e.g., an RGBD camera). The obstacle image is a part of the image(s) corresponding to the obstacle.

When the object in the image(s) is recognized as the obstacle, if the obstacle is not obstructed, the image feature(s) of the obstacle image is extracted. The contour feature(s) is obtained by the depth sensor.

S202: obtaining position information of the obstacle through the sensor module and associating the image feature(s) of the obstacle image with the position information of the obstacle.

The sensor module for obtaining the position information of the obstacle may include a distance sensor. In which, the distance sensor may be a lidar (laser radar) or an RGBD camera. The lidar ma have a smaller detection angle, for example, the detection angle less than 35 degrees.

In the following description, a lidar is taken as the depth sensor. It can be understood, in the following description, the lidar can replace with the depth sensor, while lidar data can be replaced with depth sensor data correspondingly.

The detection angle of the lidar to detect, the lidar data may be the same as the detection angle of the images, thereby facilitating the comparison of the features of the obstacle in the images with the features of the obstacle in the lidar data. In one embodiment, if the detection angles of the lidar data and the images are different, the features of the associated obstacle in the images and the lidar data can also be determined by transforming the parameters of different detection angles.

After obtaining the lidar data, the lidar data can be represent in a graphical manner based on the distance between the detected object and the lidar which is in the lidar data, and the contour feature and the position information included in the lidar data can be determined based on the change of the distance.

Figure 3:
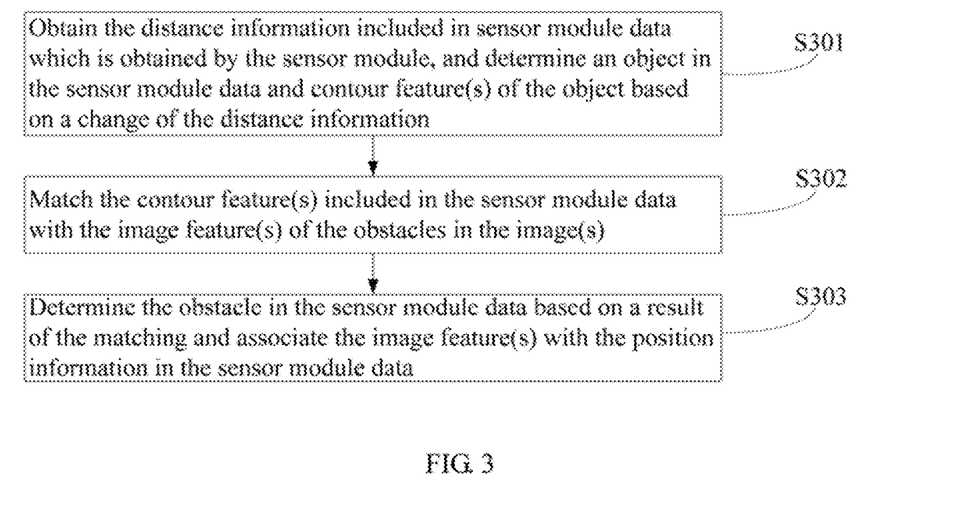
FIG. 3 is a schematic diagram of an implementation process for determining a correspondence relationship between a feature and a position of an obstacle according to the obstacle detection method of FIG. 2.

FIG. 3 is a schematic diagram of an implementation process for determining a correspondence relationship between a feature and a position of an obstacle according to the obstacle detection method of FIG. 2. As shown in FIG. 3, if the position information of the obstacle is obtained through the lidar, the sub-step of associating the feature(s) of the obstacle image with the position information of the obstacle in step S202 may include the following steps.

S301: obtaining the distance information included in sensor module data which is obtained by the sensor module, and determining an object in the sensor module data and contour feature(s) of the object based on a change of the distance information.

In this embodiment, the sensor module is the lidar, the sensor module data is lidar data, and the distance of the object in the detection area of the lidar from the lidar can be determined through the lidar, and the object in the lidar data and the contour feature(s) of the object can be determined based on the change of the distance. For example, if the change of the distance is discontinuous and exceeds a predetermined threshold, the positions corresponding to the change can be considered to belong to the contour features) of the object.

S302: matching the contour feature(s) included in the sensor module data with the image features) of the obstacles in the image(s).

After determining the image feature(s) in the image(s) and the contour feature(s) of the obstacle(s) in the lidar data, it can find whether there are similar contour feature(s) in the lidar data based on the image feature(s) of the obstacle, that is, determine whether the similarity of the feature(s) of the two is larger than a predetermined value, and then determine the position information of the obstacle in the lidar data.

S303: determining the obstacle in the sensor module data based on a result of the matching and associating the image feature(s) with the position information in the sensor module data.

After determining the obstacle in the lidar data based on the result of the matching in step S302, the position information of the obstacle can be determined through the distance information of the object included in the lidar data itself, and the image feature(s) can be associated with the position information in the rlidar data.

S203: calculating a motion state of the obstacle based on the position information of the obstacle at different moments.

The image features) of the obstacle in the image(s) are determined through the image(s), and then the position information of the obstacle in the lidar data is determined by matching the contour feature(s) in the lidar data and the image feature(s). It can track and photograph the obstacle to obtain a plurality of images including the obstacles and the lidar data, determine a plurality of position information of the obstacle, and determine a plurality of positions of the obstacle based on a plurality of the lidar data including the position information of the obstacle. If the plurality of positional information of the obstacle does not change, the obstacle may be in a stationary state; otherwise, if the plurality of positional information of the obstacle changes, the movement speed of the obstacle can be determined based on the distance and the time of the change.

As an optional implementation manner of this embodiment, the movement period and the movement speed of the obstacle whose position is discontinuously changed may also be determined through the change of the continuously collected positions of the obstacle, and the position of the obstacle when it is in the detection blind zone of the robot may be calculated based on the determined movement period and movement speed.

S204: estimating the position of the obstacle in a detection blind zone of the robot based on the motion state.

If the obstacle is within the detection zone of the robot, the motion state of the obstacle can be determined by continuously monitoring and calculating the change of the position information of the obstacle. If the obstacle leaves the detection zone, the position information of the obstacle can be estimated based on the movement speed of the obstacle that is determined when the obstacle is in the detection zone.

By combining the estimated position of the obstacle in the detection blind zone and the position information of the obstacle in the detection zone, it provides a basis for the path planning of the robot. In order to reduce calculations of the robot, if the distance between the obstacle and the robot exceeds a preset distance, the calculation and estimation of the position of the obstacle may be stopped; if the obstacle in the detection blind zone is within a preset distance range, the position information of the obstacle in the detection blind zone may be updated.

It should be understood that, the sequence of the serial number of the steps in the above-mentioned embodiments does not mean the execution order while the execution order of each process should be determined by its function and internal logic, which should not be taken as any limitation to the implementation process of the embodiments.

FIG. 4 is a schematic block diagram of an embodiment of an obstacle detection apparatus for a robot according to the present disclosure. An obstacle detection apparatus for a robot as shown in FIG. 4 that has at least a sensor module is provided. As shown in FIG. 4, the obstacle detection apparatus includes:

an image feature extracting unit 401 configured to obtain image(s) through the sensor module, detect an obstacle image of an obstacle from the image(s) according to characteristic(s) of the obstacle, and extract image feature(s) of the obstacle;

an information associating unit 402 configured to obtain a position of the obstacle through the sensor module and associate the image feature(s) of the obstacle with the position of the obstacle;

a motion state calculating unit 403 configured to calculate a motion state of the obstacle based on the position information of the obstacle at different moments; and a position estimating unit 404 configured to estimate the position of the obstacle in a detection blind zone of the robot based on the motion state.

The obstacle detection apparatus for a robot that shown in FIG. 4 corresponds to the obstacle detection method for a robot that shown in FIG. 2 and FIG. 3. In this embodiment, the image feature extracting unit 401, the information associating unit 402, the motion state calculating unit 403, and the position estimating unit 404 are implemented in the form of software, which can be computer program(s) stored in a memory of the obstacle detection apparatus and executable on a processor of the obstacle detection apparatus. In other embodiments, the image feature extracting unit 401, the information associating unit 402, the motion state calculating unit 403, and the position estimating unit 404 may be implemented in the form of hardware (e.g., a circuit of the obstacle detection apparatus which is coupled to the processor of the obstacle detection apparatus) or a combination of hardware and software (e.g., a circuit with a single chip microcomputer).

FIG. 5 is a schematic block diagram of an embodiment of a robot according to the present disclosure. As shown in FIG. 5, in this embodiment, the robot 5 includes a processor 50, a memory 51, a computer program 52, and at least a sensor module 53. The computer program 52 is stored in the memory 51 and executable on the processor 50, for example, the obstacle detection method for a robot as shown in FIG. 2 and FIG. 3. When executing (instructions in) the computer program 52, the processor 50 implements the steps in the above-mentioned embodiments of the obstacle detection method. Alternatively, when the processor 50 executes the (instructions in) computer program 52, the functions of each module/unit in the above-mentioned device embodiments are implemented. The computer program 52 includes: instructions for obtaining, through the sensor module, one or more images; instructions for detecting an obstacle image of an obstacle from the one or more images according to one or more characteristics of the obstacle; instructions for extracting one or more image features of the obstacle; instructions for obtaining, through the sensor module, position information of the obstacle; instructions for associating the one or more image features of the obstacle image with the position information of the obstacle; instructions for calculating a motion state of the obstacle based on the position information or the obstacle at different moments; and instructions for estimating the position information of the obstacle in a detection blind zone of the robot based on the motion state. In this embodiment, the sensor module 53 is an RGBD sensor for obtaining the image feature(s) and depth map data of the obstacle and obtaining the position information and contour feature(s) of the obstacle based on depth map data. In other embodiments, the sensor module 53 can be an RGB sensor for obtaining the image feature(s) of the obstacle, and the robot 5 further includes a lidar for obtaining the position information and the contour feature(s) of the obstacle.

Exemplarily, the computer program 5 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the robot 5. For example, computer program 52 can be divided into:

an image feature extracting unit configured to obtain image(s) through the sensor module, detecting an obstacle image of an obstacle from the image(s) according to characteristic(s) of the obstacle, and extract image feature(s) of the obstacle;

an information associating unit configured to obtain a position of the obstacle through the sensor module and associate the image feature(s) of the obstacle with the position of the obstacle;

a motion state calculating unit configured to calculate a motion stale of the obstacle based on the position information of the obstacle at different moments; and a position estimating unit configured to estimate the position of the obstacle in a detection blind zone of the robot based on the motion state.

It can be understood by those skilled in the an that FIG. 5 is merely an example of the robot 5 and does not constitute a limitation on the robot 5, and may include more or fewer components than those shown in the figure, or a combination of some components or different components. For example, the robot 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the robot 5, for example, a hard disk or a memory of the robot 5. The storage 51 may also be an external storage device of the robot 5, for example, a plug-in hard disk, a smart media card (SMC), a secure digital (SD) card, flash card, and the like, which is equipped on the robot 5. Furthermore, the storage 51 may further include both an internal storage unit and an external storage device, of the robot 5. The storage 51 is configured to store the computer program 52 and other programs and data required by the robot 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media, it should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented obstacle detection method, comprising:
   providing a robot comprising a processor, a camera, and a distance sensor, wherein the camera and the distance sensor are electrically coupled to the processor, and the camera comprises an red green blue depth (RGBD) sensor or an red reen blue (RGB) sensor;
   wherein the method further comprises executing on the processor the steps of:
   obtaining, through the camera, one or more images;
   recounizing an obstacle in the one or more images according to preset parameters of the obstacle, wherein the oreset narameters of the obstacle comprise a size and a hardness of the obstacle, the hardness is determined by recognizing a cateory of an object, and the hardness of the object is compared with a preset hardness to determine whether the obiect is the obstacle;
   detecting an obstacle image of the obstacle from the one or more images according to one or more chamcteristics of the obstacle;
   extracting one or more image features from the obstacle image;
   obtaining, through the distance sensor, position information of the obstacle;
   associating the one or more image features of the obstacle image with the position information of the obstacle;
   calculating a motion state of the obstacle based on the position information of the obstacle at different times;
   estimating the position information of the obstacle in a detection blind zone of the robot based on the motion state; and
   planning a path of the robot based on the position information of the obstacle in the detection blind zone and the position information of the obstacle in a detection zone of the robot, and controlling the robot to move according to the path.

2. The method of claim 1, wherein the step of obtaining, through the camera, the position information of the obstacle comprising:
   obtaining, through the camera, one or more contour features of the obstacle; and
   associating the one or more image features, the position information, and the one or more contour features of the obstacle.

3. The method of claim 1, wherein the step of calculating the motion state of the obstacle based on the one or more image features and the position information of the obstacle comprising:
   calculating a moving distance of the obstacle based on the one or more image features and the position information of the obstacle; and
   determining a moving speed of the obstacle based on the moving distance and a duration corresponding to the moving distance.

4. The method of claim 3, wherein before the step of calculating the moving distance of the obstacle based on the one or more image features and the position information of the obstacle, further comprises:
   determining whether the position information of the obstacle at different times does not change; and
   if the position information of the obstacle at different times does not change, determining that the obstacle is in a stationary state; and
   the step of calculating the moving distance of the obstacle based on the one or more image features and the position information of the obstacle, comprises:
   if the positional information of the obstacle at different times changes, calculating the moving distance of the obstacle based on the one or more image features and the position information of the obstacle.

5. The method of claim 3, wherein the step of estimating the position information of the obstacle in the detection blind zone of the robot based on the motion state comprising:
   estimating the position information of the obstacle based on the moving speed of the obstacle determined while the obstacle is in the detection zone of the robot, when the obstacle is outside the detection zone.

6. The method of claim 1, wherein after the step of estimating the position information of the obstacle in the detection blind zone of the robot based on the motion state further comprises:
   detecting whether the position information of the obstacle in the detection blind zone of the robot is within a preset distance range; and
   updating the position information of the obstacle in the detection blind zone, in response to the position information of the obstacle in the detection blind zone of the robot being within the preset distance range.

7. The method of claim 6, wherein the camera comprises the RGBD sensor; wherein the RGBD sensor obtains the one or more image features and depth map data of the obstacle and obtains the position information and the one or more contour features of the obstacle based on the depth ma data.

8. The method of claim 6, wherein the camera comprises the RGB sensor and a lidar; the RGB sensor obtains the one or more image features of the obstacle; and the lidar obtains the position information and the one or more contour features of the obstacle.

9. The method of claim 1, wherein the distance sensor is a lidar, and the step of associating the one or more image features of the obstacle image with the position information of the obstacle comprises:
   obtaining distance information included in lidar data obtained by the lidar, and determining the object in the lidar data and one or more contour features of the object based on a change of the distance information;
   matching the one or more contour features included in the lidar data with the one or more image features of the obstacles in the one or more images; and
   determining the obstacle in the lidar data based on a result of the matching and associating the one or more image features with the position information in the lidar data.

10. The method of claim 1, wherein the distance sensor is a lidar or an RGBD camera, and a detection angle of the lidar less than 35 degrees.

11. The method of claim 10, wherein detection angles of lidar data and the one or more images are different, features of the obstacle in the one or more images and the lidar data are determined by transforming parameters of different detection angles.

12. The method of claim 1, wherein when the position information of the obstacle is discontinuously changed, the step of estimating the position information of the obstacle in the detection blind zone of the robot based on the motion state comprises:
   determining a movement period and a movement speed of the obstacle through a change of the continuously collected position information of the obstacle; and
   calculating the position information of the obstacle in the detection blind zone of the robot based on the movement period and the movement speed of the obstacle.

13. A robot comprising:
   a camera comprises an red green blue depth (RGBD) sensor or an red green blue (RGB) sensor;
   a distance sensor;
   a memory;
   a processor electrically coupled to the camera and the distance sensor; and
   one or more computer programs stored in the memory and executable on the processor, wherein the one or more computer programs comprise:
   instructions for obtaining, through the camera, one or more images;
   instructions for recoinizing an obstacle in the one or more imaes according to preset parameters of the obstacle, wherein the preset parameters of the obstacle comprise a size and a hardness of the obstacle, the hardness is determined by recognizina a cateorv of an obiect, and the hardness of the obiect is compared with a preset hardness to determine whether the object is the obstacle;
   instructions for detecting an obstacle image of the obstacle from the one or more images according to one or more characteristics of the obstacle;
   instructions for extracting one or more image features frrm the obstacle;
   instructions for obtaining, through the distance sensor, position information of the obstacle;
   instructions for associating the one or more image features of the obstacle image with the position information of the obstacle;
   instructions for calculating a motion state of the obstacle based on the position information of the obstacle at different times;

instructions for estimating the position information of the obstacle in a detection blind zone of the robot based on the motion state; and instructions for planning a path of the robot based on the position information of the obstacle in the detection blind zone and the position information of the obstacle in a detection zone of the robot, and controlling the robot to move according to the path.

14. The robot of claim 13, wherein the instructions for obtaining, through the camera, the position information of the obstacle comprise:

instructions for obtaining, through the camera, one or more contour features of the obstacle; and instructions for associating the one or more image features, the position information, and the one or more contour features of the obstacle.

15. The robot of claim 13, wherein the instructions for calculating the motion state of the obstacle based on the one or more image features and the position information of the obstacle comprise:

instructions for calculating a moving distance of the obstacle based on the one or more image features and the position information of the obstacle; and instructions for determining a moving speed of the obstacle based on the moving distance and a duration corresponding to the moving distance.

16. The robot of claim 15, wherein the instructions for estimating the position information of the obstacle in the detection blind zone of the robot based on the motion state comprise:

instructions for estimating the position information of the obstacle based on the moving speed of the obstacle determined while the obstacle is in the detection zone of the robot, when the obstacle is outside the dtion zone.

17. The robot of claim 13, wherein the one or more computer programs further comprise:

instructions for detecting whether the position information of the obstacle in the detection blind zone of the robot is within a preset distance range; and instructions for updating the position information of the obstacle in the detection blind zone, in response to the position information of the obstacle in the detection blind zone of the robot being within the preset distance range.

18. The robot of claim 17, wherein the camera comprises the RGBD sensor; wherein the RGBD sensor obtains the one or more image features and depth map data of the obstacle and obtains the position information and the one or more contour features of the obstacle based on the depth map data.

19. The robot of claim 17, wherein the camera comprises the RGB sensor and a lidar; the RGB sensor obtain the one or more image features of the obstacle; and the lidar obtains the position information and the one or more contour features of the obstacle.

20. The robot of claim 13, wherein the distance sensor is a lidar, and the instructions for associating the one or more image features of the obstacle image with the position information of the obstacle comprise:

instructions for obtaining distance information included in lidar data obtained by the lidar, and determining the object in the lidar data and one or more contour features of the object based on a change of the distance information;

instructions for matching the one or more contour features included in the lidar data with the one or more image features of the obstacles in the one or more images; and instructions for determining the obstacle in the lidar data based on a result of the matching and associating the one or more image features with the position information in the lidar data.

\* \* \* \* \*